Jan. 19, 1960 M. E. FRY 2,921,575
DOMESTIC APPLIANCE
Filed April 25, 1958 5 Sheets-Sheet 1

INVENTOR.
Millard E. Fry
BY *Edwin S. Dybvig*
His Attorney

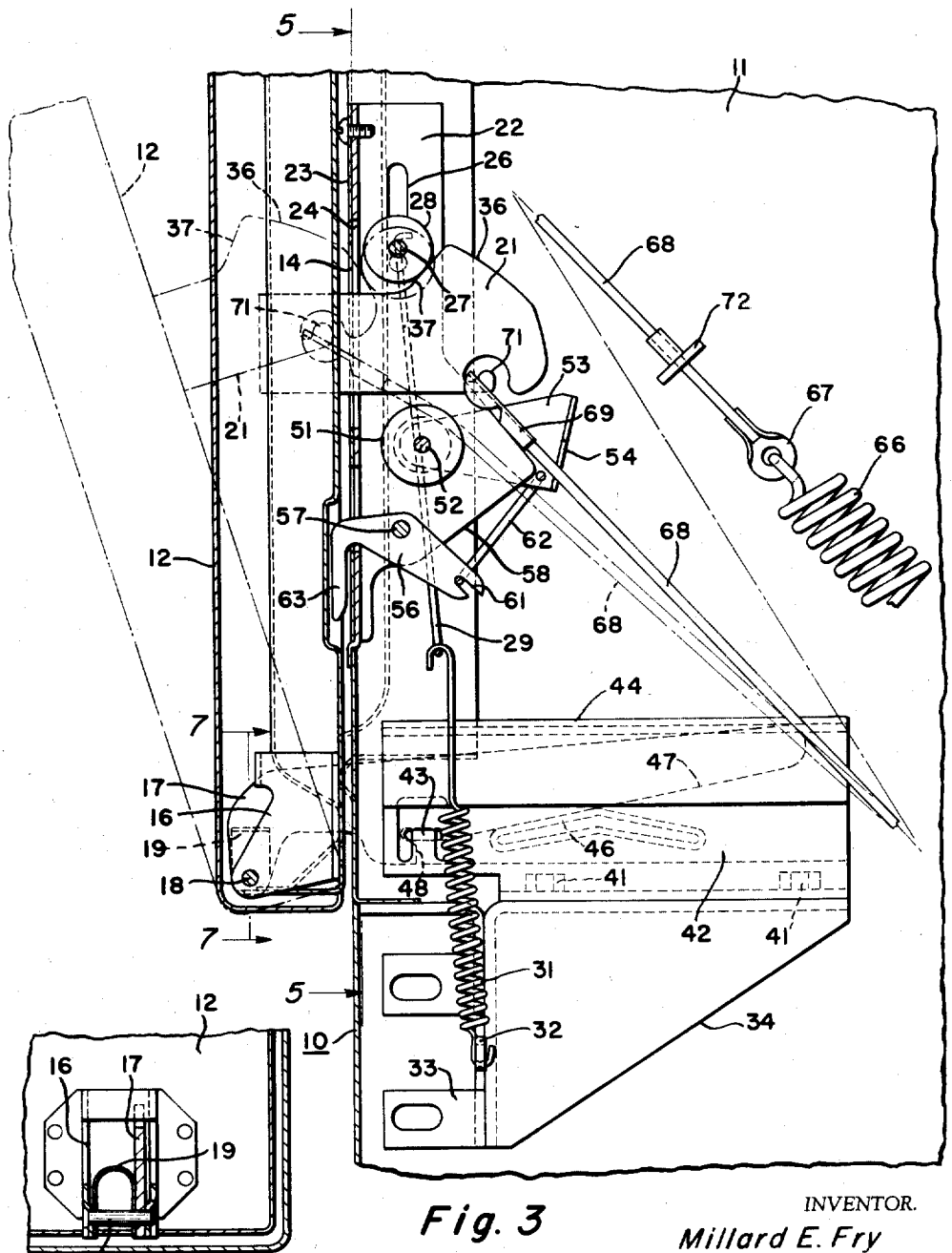

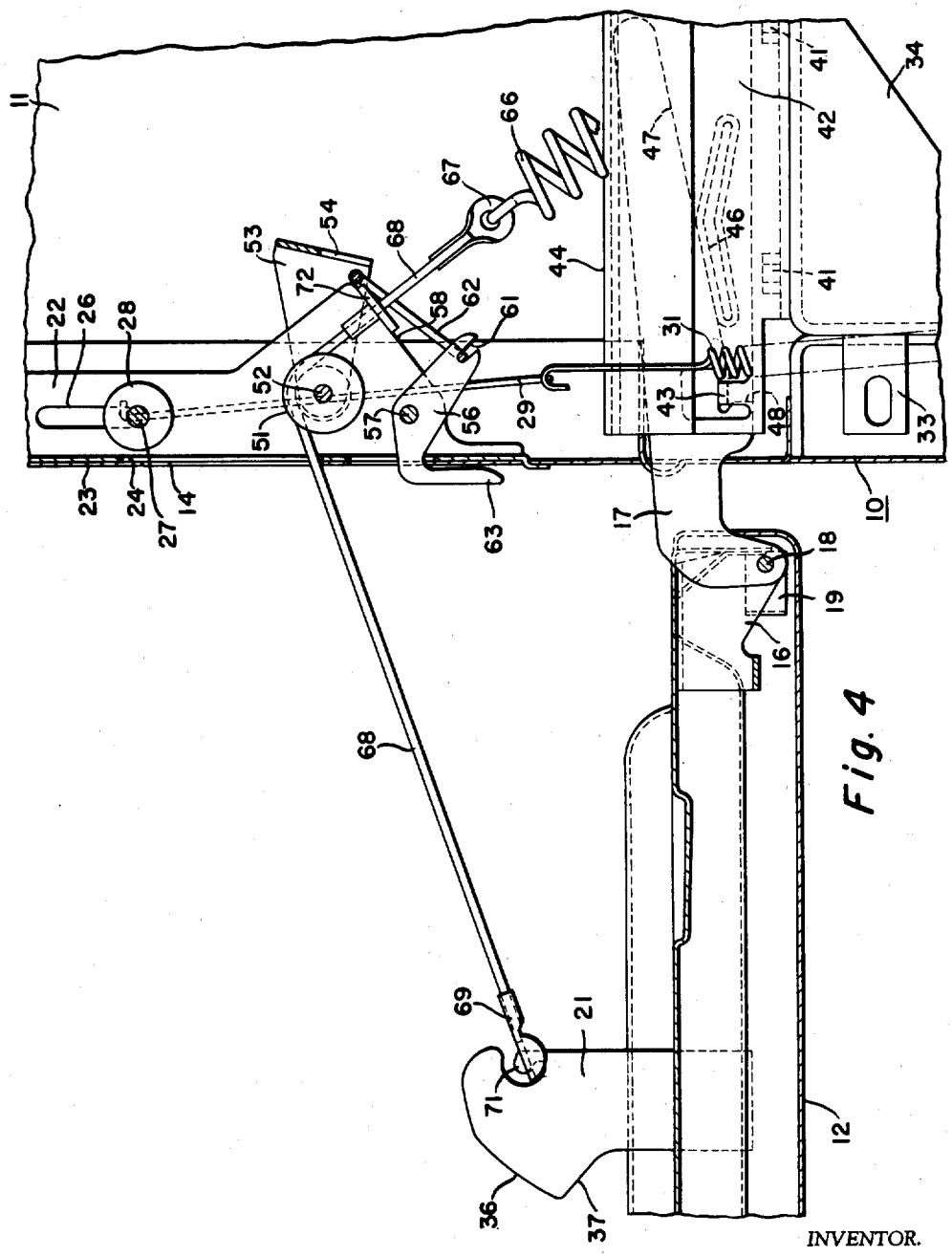

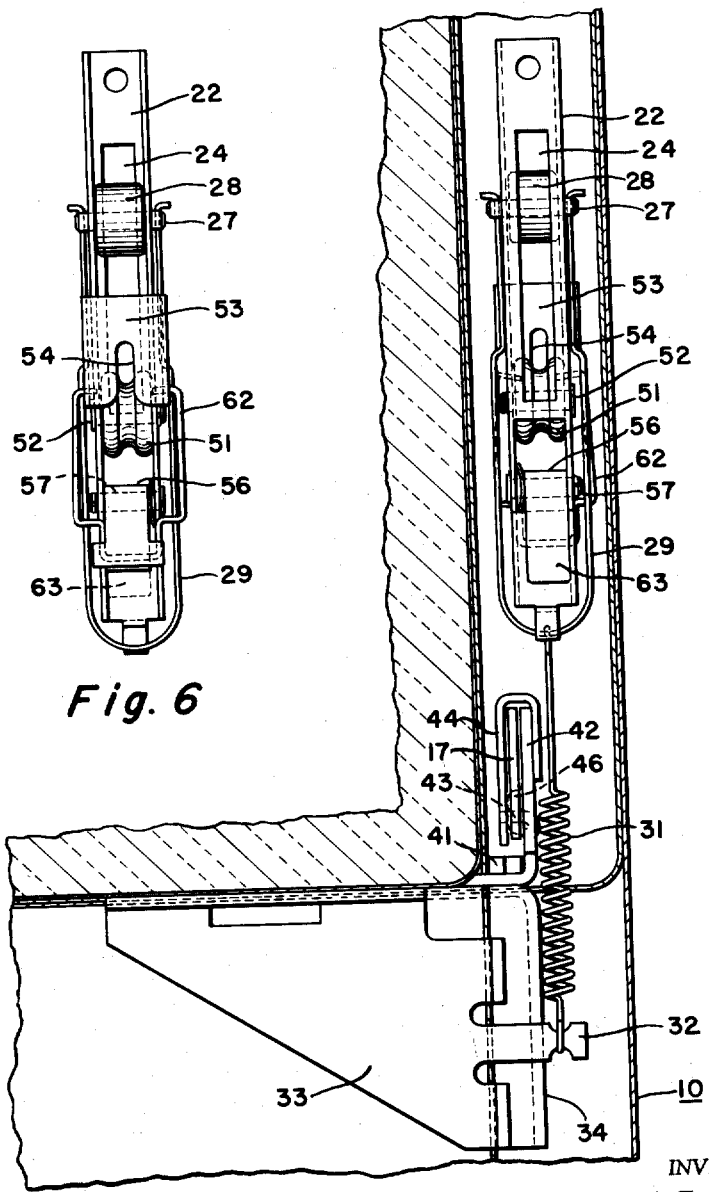

Jan. 19, 1960   M. E. FRY   2,921,575
DOMESTIC APPLIANCE
Filed April 25, 1958   5 Sheets—Sheet 5

INVENTOR.
Millard E. Fry
BY *Edwin S. Dybvig*
His Attorney

United States Patent Office 2,921,575
Patented Jan. 19, 1960

2,921,575

DOMESTIC APPLIANCE

Millard E. Fry, Dayton, Ohio, assignor to General Motors Corporation, Detroit, Mich., a corporation of Delaware Application April 25, 1958, Serial No. 730,911

5 Claims. (Cl. 126—191)

This invention relates to removable oven doors that are hinged along the bottom thereof for vertical swinging movement and particularly to a lockable cable-like counter-balancing mechanism therefor which permits quick and easy separation of the door therefrom to ready the door for removal from the oven.

It is well known that a cooking range oven door must be closed tightly for baking purposes, it must be held slightly ajar for broiling purposes, it must have its opening movement blocked or limited to a substantially horizontal open position and should have all of its movements counter-balanced. In addition an oven door should be quickly and easily removable from the oven and replaceable thereon to facilitate cleaning of the interior of the oven. It is understood that others have provided these features but the prior structures have not been entirely satisfactory for various reasons. For example removable cooking range oven doors are of themselves relatively heavy and difficult to be manipulated by a housewife during removal thereof from the range. Therefore a housewife should not be burdened by additional weight of a counter-balancing mechanism having its parts incorporated in or on a removable door. Furthermore a spring means of a removable oven door counter-balancing mechanism should not be required to be disconnected from the mechanism for removal of the door since the removable feature thereof will be ignored because it is difficult, if not impossible, for a housewife to stretch the spring and reconnect it to the mechanism.

An object of this invention is to provide an oven with a removable door which overcomes the difficulties and objections of prior doors so that the removability feature will not be ignored and the door removed with ease as frequently as desired.

Another object of this invention is to provide a novel flexible cable arrangement for holding a range oven door in a substantially horizontal open position which arrangement forms a part of a spring tensioned mechanism for counter-balancing vertical movements of the door.

A further object of this invention is to provide a lockable cable-like counter-balancing mechanism for a removable door that permits the door to be separated from the mechanism without disconnecting or dismantling spring parts thereof to ready the door for removal or detachment from a cabinet structure upon which it is swingably supported.

A still further and more specific object of this invention is to provide a door having an inseparable hinge means including a pivoted arm removably interlocked to a cabinet with means which acts on the pivot portion of the hinge, when the door is removed from the cabinet, to frictionally hold the arm in a predetermined set position relative to the door whereby the arm serves as a foot for supporting the removed door in an upright position on a flat support.

Further objects and advantages of the present invention will be apparent from the following description, reference being had to the accompanying drawings, wherein a preferred form of the present invention is clearly shown.

In the drawings:

Figure 3 is an enlarged fragmentary sectional view taken on the line 3—3 of Figure 1 showing a cable-like counter-balancing mechanism for the oven door with the door in closed position;

Figure 4 is a view similar to Figure 3 showing the oven door supported in a horizontal open position by the cable-like counter-balancing mechanism;

Figure 5 is a fragmentary sectional view taken on the line 5—5 of Figure 3 showing elements of a biasing device for the oven door;

Figure 6 is a rear view of elements of the door biasing device shown in Figure 5;

Figure 8:
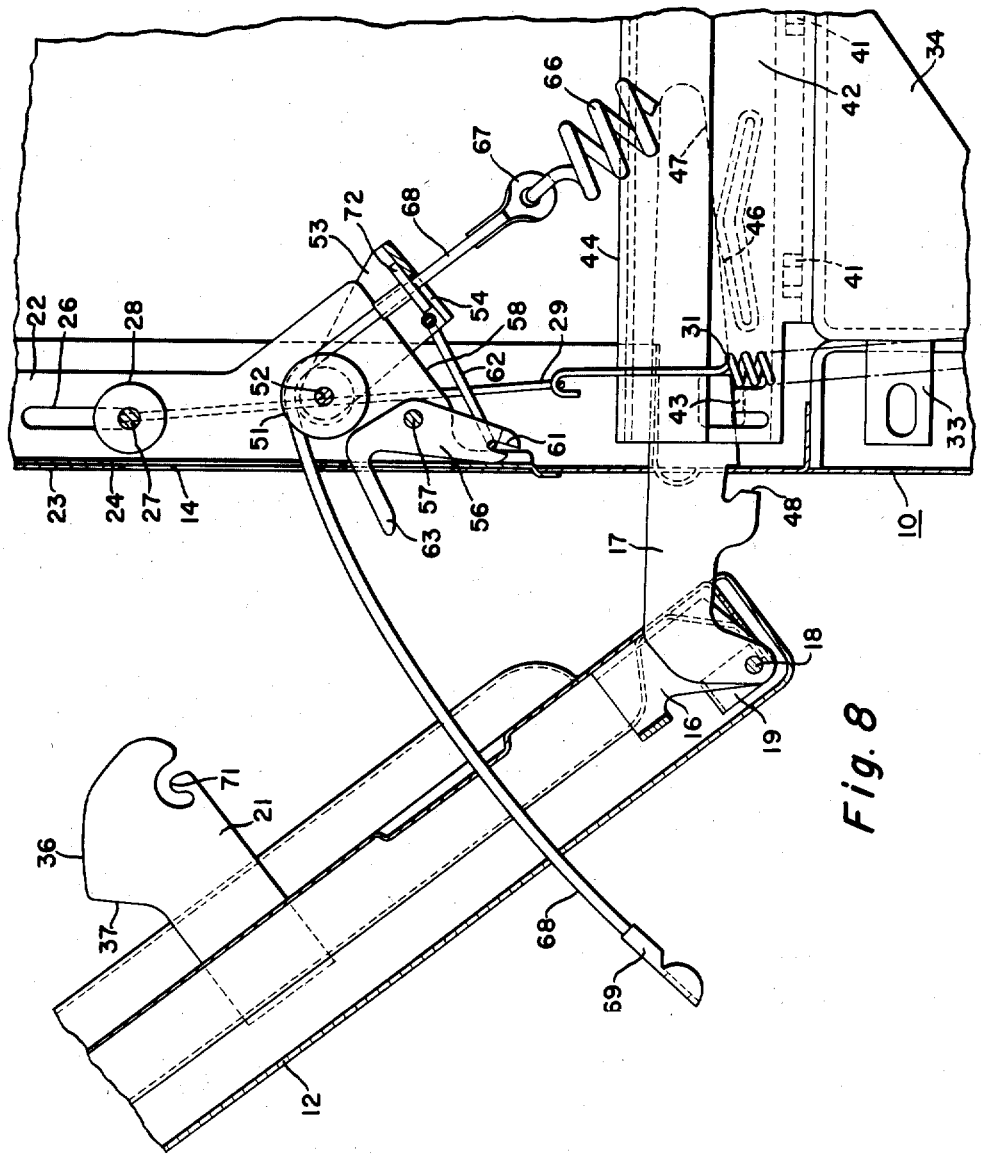

Figure 7 is a fragmentary sectional view taken on the line 7—7 of Figure 3 showing a spring associated with the pivot of a hinge carried by the oven door; and Figure 8 is a view similar to Figure 4 showing the door counter-balancing mechanism locked with the cable thereof detached from the door and showing the interlock of the door hinge arm to the range cabinet released and the door readied for removal from the cabinet.

Figure 1:
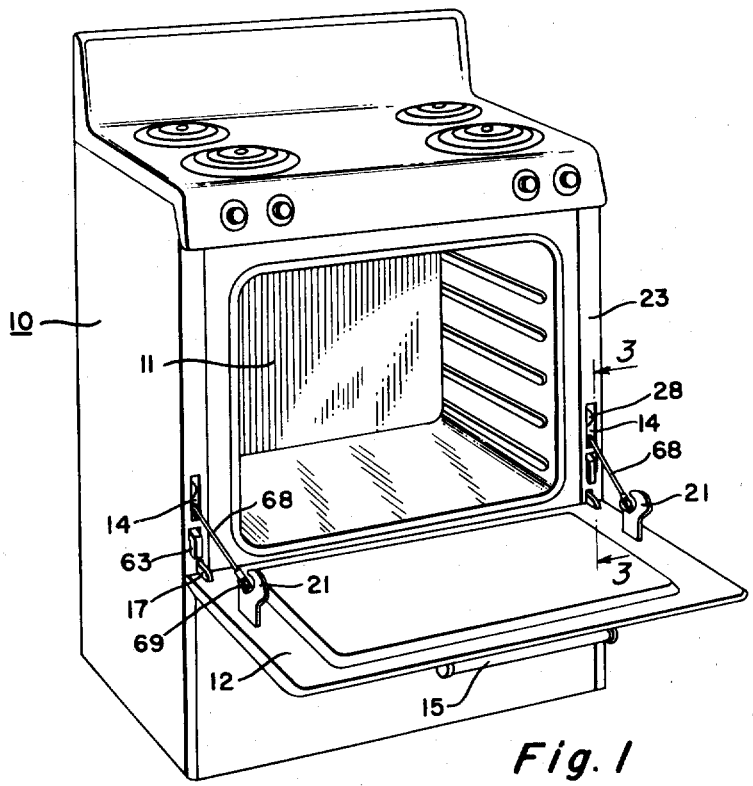
Figure 1 is a perspective view of a cooking range having the present invention incorporated therein and showing the range oven door in open position.

Referring to the drawings there is shown in Figure 1 a cooking range 10 having an insulated baking oven 11 therein which is representative of a cabinet or other enclosure provided with a chamber and with which it is desired to use a removable door having a latch striker and inseparable hinge means thereon to be completely assembled before mounting the door upon the cabinet. The heating of oven 11 in the illustrated range is unimportant to the present invention and is not shown. According to this invention the front access opening of oven 11 is normally closed by a hingedly mounted removable door structure 12 swingable from a vertical closed position into a substantially horizontal open position. A spring tensioned biasing device or latch arrangement is provided in the range body for latching and biasing door 12 in its closed position and for holding the door in a slightly open or ajar "Broil" position. The vertical swinging movements of door 12 are counter-balanced by a spring tensioned cable-like mechanism which is lockable in a certain position to render it ineffective for permitting removal of the removable oven door from the range. The counter-balancing mechanism is separate from and independent of the biasing device for door 12 and the cables of the mechanism support door 12 in its predetermined horizontal open position which cables disappear or are retracted into side walls of the range cabinet through apertures 14 (see Figure 1) as the door is closed. Door 12 is supported at both of its sides and like counter-balancing mechanisms are shown on each side of the door. However only a single counter-balancing mechanism may be employed on one side of door 12. The arrangement herein disclosed embodies the concepts of the present invention in that the oven door is inseparable from its pivotal hinge means, which are removably interlocked to the range cabinet, and more important door 12 is detachable or separable from the counter-balancing mechanism and from the door biasing device. This together with the feature of locking the door counter-balancing mechanism permits removal of door 12 from range 10 as frequently as desired and with a minimum of effort on the part of a housewife.

Figure 2:
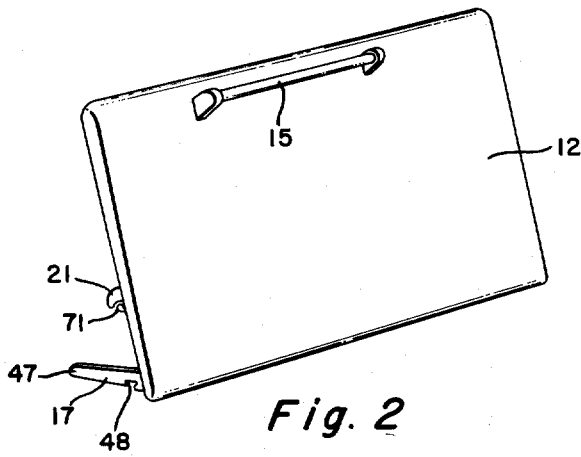
Figure 2 is a view showing the oven door removed from the range and adapted to be supported in an upright position on a flat support.

A preferred embodiment of the present invention will now be described with reference to Figure 3 wherein a fragmentary side portion of range cabinet 10 is shown with the oven door 12 in closed, oven-sealing position. Door 12 has a handle 15 thereon (see Figure 2) and is provided on the lower portion of each inner side thereof with a hinge bracket 16 having an arm 17 inseparably pivoted thereto by a pin 18 (see Figure 7). An inverted U-shaped spring 19 carried on pin 18 bears on one side of this hinge means against bracket 16 and on the other side against arm 17 and provides a friction applying means therebetween. The friction afforded by spring 19 is negligible during swinging movements of door 12 but is insufficient to accomplish a specified purpose thereof as will be hereinafter described. A striker 21 is rigidly secured to each side of door 12 (see Figure 1) in spaced relation to its hinge means and is adapted to project into a roller catch or latch device (see Figure 3), through opening 14, when the door is in closed position. The door 12 is otherwise of a more or less conventional construction needing no further detailed description herein. The door catch or latch device includes a U-shaped plate 22 secured in any suitable manner to a front panel 23 of range 10 and has an opening 24 therein registering with aperture 14 (see Figures 3, 5 and 6). Legs of plate 22 are slotted as at 26 and a pin or shaft 27 located in the vertical slots 26 carries a roller 28 thereon. A stiff U-shaped wire 29 extends around the legs of plate 22 and has its ends projected through suitable openings in pin 27 and bent thereover so as to retain this pin in place. A latch spring 31 has its one end hooked over and fastened to the bight portion of wire 29 and has its other end fastened to an ear 32 formed on a plate 33 which is welded to a corner gusset 34 of the range. Spring 31 maintains a continuous tension on wire 29 to pull roller 28 downwardly. Striker 21 is provided with a cam surface 36 which strikes roller 28 upon closing door 12 and moves the roller upwardly in slots 26 whereafter roller 28 rides downwardly over an inclined keeper surface 37 on striker 21 to latch the door shut in which position it is biased by the spring 31. In Figure 3 of the drawings door 12 and striker 21 are shown by dot-dash lines in an ajar or partially open "Broil" position wherein the striker 21 is biased against roller 28 by a door counter-balancing mechanism of the present invention. Door 12 is removably mounted on range 10 by arm 17 of the door hinge means being detachably secured to or interlocked with a rigid upright double plate member secured to the corner gusset 34 by bolts 41. This double plate member includes a plate 42 having a lug 43 struck therefrom and bent horizontally relative thereto (see Figure 5). Another inverted substantially U-shaped plate 44 is welded to plate 42 to provide a sleeve-like passageway between the plates 42 and 44 for the reception of arm 17. Plate 44 is provided with a depressed portion which forms an inclined ledge 46 intermediate the plates 42 and 44 (see Figure 3). In order to mount door 12 on cabinet 10 an end 47 of arm 17 is inserted into the sleeve between plates 42 and 44 of the double plate member and guided by ledge 46 upwardly into contact with the bight portion of inverted U-shaped plate 44. At this time the door 12 and arm 17 are lowered and a notch 48 provided in the lower edge of arm 17 straddles and receives or fits over the lug 43 on plate 42 to thereby detachably interlock the arm and consequently the door to range 10.

Latch plate 22 carries between its legs a pulley roller or cable guide 51 on a pin or shaft 52, fixed to the plate, and a U-shaped lock bracket 53, notched out as at 54 (see Figure 6), is pivotally mounted on the ends of shaft 52. A lever 56 is pivotally mounted on a pin or shaft 57 carried by latch plate 22 at a point thereon adjacent an angular stop edge surface 58 thereof which stop surface is utilized for a purpose to be presently described. The inner end of lever 56 is notched out as at 61 and receives another U-shaped stiff wire 62 having its ends fastened in suitable holes provided in lock bracket 53. Handle end 63 of lever 56 projects through suitable registering openings provided in latch plate 22 and in front wall or panel 23 of the range cabinet 10. The handle end 63 of lever 56 parallels and lies along wall 23 and the inner panel of door 12 is suitably recessed to clear this end of the lever (see Figures 3 and 4). Lever 56 while in this normal position holds lock bracket 53 in an upper inactive or ineffective position. Guide or pulley roller 51, lock bracket 53 and lever 56 form elements associated with a spring tensioned cable-like mechanism for counter-balancing movements of door 12 to now be described. This mechanism comprises or includes a coil spring 66 having one end thereof anchored to a lower rear portion of the range body with its other end connected to a metal clip 67 rigidly secured on an end of a flexible non-stretchable cable 68. The opposite end of cable 68 has a metal clip 69 rigidly secured thereto and detachably hooked over or anchored to a hook 71 formed on the lower portion of latch striker 21 on door 12. Cable 68 is draped or extended over pulley roller 51, to be guided thereby, and this cable is continuously biased or tensioned by spring 66. An obstruction in the form of a rivet-like bushing 72 is rigidly secured upon cable 68 by welding or soldering same thereto at a predetermined point thereon intermediate the end clips 67 and 69 so as to be disposed between spring 66 and the stop surface 58 of stationary U-shaped plate 22. The cable 68, bushing 72 and stop surface 58 form or provide the cable-like mechanism with means for blocking opening movement of door 12 at a substantially horizontal utensil supporting position in front of oven 11 and lever 56. Lock bracket 53 and bushing 17 provide the mechanism with a manually actuated locking means the purpose of which will become apparent hereinafter. The cable-like counter-balancing mechanism normally prevents removal of the removable oven door from the range cabinet. While the door catch device or latch means and the counter-balancing mechanism has been described in a singular manner, it is to be noted (see Figure 1) that one of each of such devices and mechanisms is preferred to be employed on opposite sides of the oven door 12.

The functioning of the elements embodied in the latch device and in the cable-like counter-balancing mechanism disclosed as well as advantages derived therefrom will best be understood by a description thereof in connection with various positions of the range oven door. With door 12 closed, as shown in full lines in Figure 3, an operator or user of the range cabinet 10 may grasp the door handle 15 and pull outwardly and downwardly thereon. In so doing, the roller 28 will be cammed upwardly, in vertical slots 26, by keeper surface 37 on striker 21 until the cam surface 36 passes outward of the latch or catch device beyond roller 28 against the bias of spring 31. As door 12 continues its pivotal downward swinging movement the cable 68 will, in response thereto, move or be projected outwardly of range cabinet 10 through opening 14, guided by pulley roller 51, against the bias of spring 66 to thereby counter-balance the swinging movement of the door. When door 12 reaches a predetermined substantially horizontal position, as shown in Figure 4 of the drawings, the outwardly flanged part of obstruction or bushing 72 on cable 68 engages the spaced apart inclined stop surfaces 58 on the U-shaped plate 22 to thereby block and hold the door in this predetermined open position for access to oven 11. During use of oven 11 for broiling meat, fish or other foods it is desired to support door 12 in a slightly ajar open "Broil" position as shown by the dot-dash lines in Figure 3 of the drawings. The opposed biasing effects of springs 31 and 66 will neutralize each other and maintain the door ajar in said "Broil" position.

To release door 12 preparatory to and to ready same for removal from range cabinet 10 for any purpose such, for example, as to facilitate cleaning of the interior of oven 11, the counter-balancing mechanism in the present disclosure is to be locked and rendered ineffective without dismantling parts thereof and more important without requiring a housewife to exert force thereto. After swinging door 12 into its blocked predetermined open position shown in Figure 4 the housewife grasps handle end 63 of lever 56 at the front of range 10 and shifts same upwardly. This pivots lever 56 about its mounting pin or shaft 57 to move its inner end downwardly whereby wire member 62 pulls lock bracket 53 down so that side walls of notch 54 therein straddle cable 68 beneath the obstruction or bushing 72 thereon while the same is in engagement with the stop surface 58 on plate 22 as shown in Figure 4. Door 12 is then swung a short distance toward closed position whereupon spring 66 pulls cable 68 and consequently bushing 72 against the lowered lock bracket 53 to thereby lock and render the door counter-balancing mechanism ineffective. With the mechanism so blocked and that portion of cable 68 intermediate bushing 72 and its door anchored end now free or untensioned by spring 66 the cable is flexed and clip 69 thereon unhooked from hook 71 on striker 21 for detaching the cable 68 from the door (see Figure 8) to thus ready removable door 12 for removal. In order to complete removal of door 12 from cabinet 10 the door is elevated relative to the range and this lifts notch 48 in hinge arm 17 upwardly away from the lug 43 whereupon door 12 together with its inseparable hinge arm 17 is shifted forwardly of the range to slide arm 17 out of the range body.

After door 12 has been removed from range 10 hinge arm 17 on the door is adjusted into a substantially right angled position with respect thereto and spring 19 acts on the pivotal connection of the door hinge means to restrain movement of arm 17 relative to the door. In other words spring 19 applies friction between a leg of hinge bracket 16 and arm 17 (see Figure 7) to frictionally retain arm 17 in an adjusted position whereby the pivoted arm serves as a foot on door 12 for supporting same in an upright position on a flat support such as the floor upon which range 10 is supported (see Figure 2). This facilitates the removal operation of door 12 and eliminates the necessity of carrying the door to a remote ledge where the door would have to be rotated and supported in a flat position on the ledge. In this manner the finish on the inner or outer panels of door 12, whatever it may be, is prevented from being scratched and/or damaged during a door removal operation. Thus while arm 17 is inseparably and pivotally connected to door 12 a novel means is associated therewith for holding the door in an upright balanced supported position on a floor adjacent range 10 during the act of cleaning oven 11.

In the present disclosure oven door 12 of range 10 is separated from the door counter-balancing mechanism, which is carried by the range cabinet, and in this respect is distinguished from prior arrangements wherein such mechanism is carried by and removable with a door. This avoids adding weight of a counter-balancing mechanism to a door for facilitating and lessening efforts of a housewife in removing a door from a range. By locking and rendering the door counter-balancing mechanism ineffective during a door removing operation a tensioned spring of the mechanism is not required to be forcibly stretched and detached from the mechanism and a housewife may therefore remove the door with ease as frequently as desired. Also the freed end of cable 68 of the cable-like mechanism herein disclosed permits a housewife to replace or remount removable door 12 onto range 10 with a minimum of effort on her part since the door removal operations are merely reversed when the door is to be remounted upon the cabinet. By the present arrangement complicated procedures involved in removing and replacing a removable range oven door are eliminated and the removability feature or advantage of the door should, instead of being ignored, be welcomed by many housewives and used occasionally so as to maintain the oven in a clean sanitary condition.

While the form of embodiment of the invention as herein disclosed constitutes a preferred form, it is to be understood that other forms might be adopted, as may come within the scope of the claims which follow.

What is claimed is as follows:

1. In combination, a cabinet having a chamber therein provided with an opening in a wall thereof, a removable door for said opening, inseparable hinge means for said door, said hinge means including a hinge arm pivoted to a part of said door for movement with respect thereto by a hinge pin immovable relative to the door, said arm being detachably interlocked to a wall of said cabinet to mount the door thereon for movement from a closed position to an open position about said hinge pin, a flexible nonstretchable cable having one end portion thereof retained within said cabinet when said door is removed therefrom and having another end portion detachably connected to said door at a point thereon above said inseparable hinge means, a roller stationarily mounted on said cabinet over which said cable is adapted to drape and be guided during the opening and closing movements of said door, a mechanism for counter-balancing movements of said door, said mechanism comprising in addition to said cable and said roller a spring anchored at one end to said cabinet with its other end attached to the end portion of said cable retained within the cabinet, said spring and said cable cooperating with the interlocked hinge arm to normally prevent removal of the removable door from said cabinet, stop means on and adjacent said one end portion of said cable engageable with a stationary part of said cabinet for blocking the opening movement of said door at a predetermined substantially horizontal open position in which a part of the cable is extended outwardly of the cabinet so as to render said another end portion thereof accessible from exteriorly of said cabinet, means permanently mounted on said cabinet for swinging movement with respect thereto into the path of movement of said stop means for locking said mechanism while said spring is attached to said one end portion of said cable and maintained tensioned, the locking of said mechanism rendering said spring ineffective to facilitate removal of the door from said cabinet, said door then being movable from said predetermined open position toward its closed position to slacken at least said part of said cable extended outwardly of the cabinet whereby the cable may be flexed to detach said another end portion thereof from the door for separating said door from said counter-balancing mechanism, and said hinge arm thereafter being detachable from its interlock on said cabinet wall to remove said door and its inseparable hinge means as a unit from the cabinet.

2. The combination defined by claim 1 wherein means cooperates with the inseparable hinge means on the door to hold the hinge arm at substantially a right angle position with respect to a face thereof when same is removed from the cabinet whereby the arm serves as a foot on the door to support it in an upright balanced position on a flat surface.

3. In combination, a cabinet having a chamber therein provided with an opening in a wall thereof, a removable door for said opening, inseparable hinge means for said door, said hinge means including a hinge arm pivoted to a part of said door for movement with respect thereto by a hinge pin immovable relative to the door, said arm being detachably interlocked to a wall of said cabinet to mount the door thereon for movement from a closed position to an open position about said hinge pin, a flexible non-stretchable cable having one end portion thereof retained within said cabinet when said door is removed therefrom and having another end portion detachably connected to said door at a point thereon above said inseparable hinge means, a roller stationarily mounted on said cabinet over which said cable is adapted to drape and be guided during the opening and closing movements of said door, a mechanism for counterbalancing movements of said door, said mechanism comprising in addition to said cable and said roller a spring anchored at one end to said cabinet with its other end attached to the end portion of said cable retained within the cabinet, said spring and said cable cooperating with the interlocked hinge arm to normally prevent removal of the removable door from said cabinet, biasing means on said cabinet separate from and acting independent of said counter-balancing mechanism engageable with a part of said door for neutralizing the mechanism at a position of the door intermediate its said closed and open positions to hold the door ajar with respect to the chamber opening, stop means on and adjacent said one end portion of said cable engageable with a stationary part of said cabinet for blocking the opening movement of said door at a predetermined substantially horizontal open position in which a part of the cable is extended outwardly of the cabinet so as to render said another end portion thereof accessible from exteriorly of said cabinet, means permanently mounted on said cabinet for swinging movement with respect thereto into the path of movement of said stop means for locking said mechanism while said spring is attached to said one end portion of said cable and maintained tensioned, the locking of said mechanism rendering said spring ineffective to facilitate removal of the door from said cabinet, said door then being movable from said predetermined open position toward its closed position to slacken at least said part of said cable extended outwardly of the cabinet whereby the cable may be flexed to detach said another end portion thereof from the door for separating said door from said counter-balancing mechanism and said biasing means without disconnecting parts of the biasing means from said cabinet, and said hinge arm thereafter being detachable from its interlock on said cabinet wall to remove said door and its inseparable hinge means as a unit from the cabinet.

4. The combination defined by claim 3 wherein means cooperates with the inseparable hinge means on the door to hold the hinge arm at substantially a right angle position with respect to a face thereof when same is removed from the cabinet whereby the arm serves as a foot on the door to support it in an upright balanced position on a flat surface.

5. In combination, a cabinet having a chamber therein provided with an access opening in a forwardly facing wall thereof, a door for said opening, said door having an inseparable hinge means thereon including an arm extending into said cabinet and interlocked with a wall thereof, said door being swingable about said hinge means from a vertical shut position to a horizontal open position, the interlock of said arm to said cabinet wall being detachable for removing said door and its hinge means as a unit from the cabinet, and means cooperating with said hinge means on said door for holding said hinge arm in a substantially right angle position relative to a face of the door when it is removed from said cabinet whereby the arm serves as a foot for supporting said door in an upright position on a flat surface.

References Cited in the file of this patent

UNITED STATES PATENTS

| | | |
|---|---|---|
| 2,063,376 | Hausser | Dec. 8, 1936 |
| 2,823,661 | Grannan | Feb. 18, 1958 |